United States Patent [19]
Karube et al.

[11] Patent Number: 5,889,630
[45] Date of Patent: Mar. 30, 1999

[54] HIGH DENSITY MAGNETIC RECORDER

[75] Inventors: Hiro Karube; Akihiro Osaka, both of Tokyo, Japan

[73] Assignee: NEC Corporation, Japan

[21] Appl. No.: 785,892

[22] Filed: Jan. 21, 1997

[30] Foreign Application Priority Data

Jan. 22, 1996 [JP] Japan .................................. 8-007938

[51] Int. Cl.$^6$ .................................................. G11B 21/02
[52] U.S. Cl. ............................................. 360/75; 360/104
[58] Field of Search ........................ 360/25, 69, 77.08, 360/119, 126, 113, 122, 104, 103, 13, 77.11, 77.12, 124

[56] References Cited

U.S. PATENT DOCUMENTS

5,388,007  2/1995  Sekimoto .................................. 360/13
5,691,862  11/1997  Hashimoto .............................. 360/104

Primary Examiner—Muhammad N. Edun
Attorney, Agent, or Firm—Ostrolenk, Faber, Gerb & Soffen, LLP

[57] ABSTRACT

In order to avoid appearance of indifferent zone of positioning signals obtained from a burst pattern recorded on a magnetic disk because of erase bands derived on outer border lines of burst tracks, width of a magnetic gap of the reproducing head of the invention is designed to be not narrower than width of a pitch of the burst tracks added with width of the erased band and not wider than two times of said width of a pitch of the burst tracks reduced of said width of the erased band.

4 Claims, 10 Drawing Sheets

3 : BURST PATTERN
3A~3D : STRIPE STRIP
4 : ERASE BAND
H1, H2 : HEAD POSITION
W : REPRODUCING HEAD WIDTH
P : BURST TRACK PITCH
e : ERASE WIDTH

FIG. 1

3 : BURST PATTERN
3A~3D : STRIPE STRIP
4 : ERASE BAND
H1, H2 : HEAD POSITION
W : REPRODUCING HEAD WIDTH
P : BURST TRACK PITCH
e : ERASE WIDTH

FIG.2

3 : BURST PATTERN
3A~3D : STRIPE STRIP
4 : ERASE BAND
H3, H4 : HEAD POSITION
W : REPRODUCING HEAD WIDTH
P : BURST TRACK PITCH
e : ERASE WIDTH

FIG.3

2: DATA CYLINDERS
21: DATA TRACK
3: BURST PATTERN
3A~3D: STRIPE STRIP

1 : MAGNETIC DISK
2 : DATA CYLINDERS
21 : DATA TRACK
3 : BURST PATTERN
4 : ERASE BAND
H : REPRODUCING HEAD

HIGH DENSITY MAGNETIC RECORDER

BACKGROUND OF THE INVENTION

The present invention relates to a high density magnetic recorder, and particularly to that provided with a magnetic recording disk wherein burst patterns are recorded for positioning magnetic head of the magnetic recorder.

Together with development of multi-media devices, recording density of magnetic recorders has become higher year by year. For realizing the higher recording density, the higher recording track density, that is, the narrower recording track pitch being required, a recording track pitch of 6000 TPI (Tracks Par an Inch), namely a track pitch of 4 μm is attained today.

For recording and reading such high density recording tracks, high precision positioning of the magnetic head is indispensable. For that purpose, several methods have been proposed, one of which is a method of magnetic head positioning according to signals obtained by the magnetic head detecting a specific pattern, called the burst pattern, recorded on the magnetic recording media.

Figure 4A:
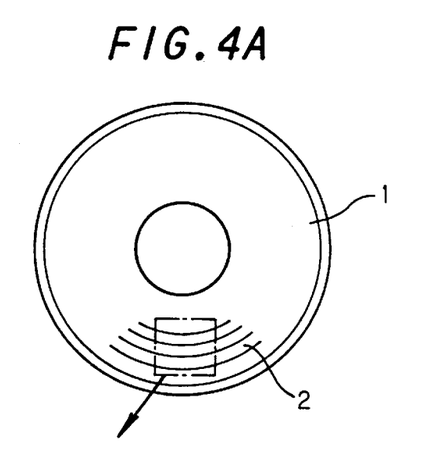
FIG. 4A illustrates a magnetic disk 1, in data cylinders 2 thereof the burst pattern 3 is recorded.
Figure 4B:
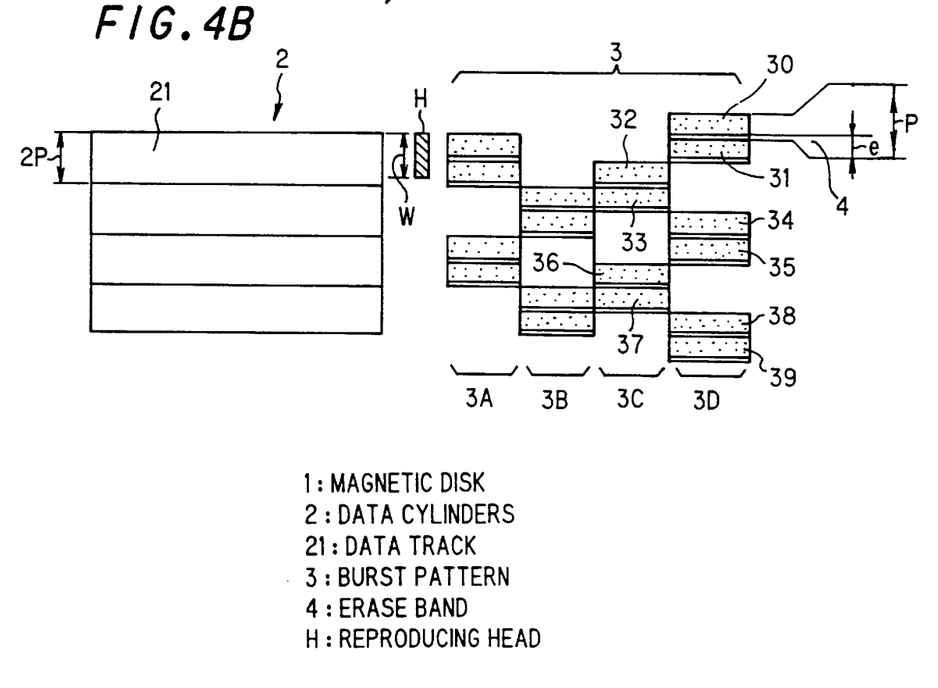
FIG. 4B shows the data cylinders 2 composed of a plurality of data tracks 21 in the left half, and the burst pattern 3 recorded therein in the right half.

FIG. 4A illustrates a magnetic disk 1, in data cylinders 2 thereof the burst pattern 3 is recorded, as shown in FIG. 4B. In FIG. 4B, the right-left direction represents the rotating direction of the magnetic disk 1. The data cylinders 2 are composed of a plurality of data tracks 21, as shown in the left half of FIG. 4B, and on a part of which is recorded the burst pattern 3, the details thereof are illustrated in the right half of FIG. 4B.

In the example of FIG. 4B, the burst pattern 3 consists of four stripe strips 3A, 3B, 3C and 3D, adjacent with each other in the rotating direction. The defining width of a data track is 2P, and each of the four stripe strips 3A to 3D is composed of a sequence of a recorded area and a blank area each having a width 2P ranged in turn in the radial direction of the magnetic disk 1. The recorded areas are recorded, by a recording head provided for data recording, in such a manner that their pattern phases differ by 2P between the former two stripe strips 3A and 3B and the latter two stripe strips 3C and 3D, and by P between the second and the third stripe strips 3B and 3C, to be read out by a reproducing head H to be positioned.

In the example, signal intensity differences A−B and C−D are calculated, A to D being signal intensities obtained by the reproducing head H at the stripe strips 3A to 3D respectively. Each of the signal intensity differences A−B and C−D is to follow a quasi-sine curve having a cycle of 4P and a phase difference of P with each other, when radial position of the reproducing head H is changed. Thus, the radial position of the reproducing head H can be precisely specified and controlled in a width of 4P according to the signal intensity differences A−B and C−D.

However, the recording area having a radial width 2P can not be recorded by one writing, since the width of the recording head is generally designed to be narrower than the data track width 2P. Therefore, each of the recording areas of the burst pattern 3 should be recorded by two writings, shifting the recording head by a burst track pitch P, that is, ½ of the data track pitch 2P, and so, inevitably accompanied by an erase band 4 having an erase width e derived on each outer border line of burst tracks, 30 to 39 for example, as illustrated in FIG. 4B. The erase width e is determined by magnetic field distribution at edges of magnetic gap of the recording head and magnetic characteristic of the magnetic disk 1 such as crystal axis distribution in its recording layer.

When there are derived these erase bands 4 in the recorded areas of the burst pattern 3, there arise indifferent zones where both the signal intensity differences A−B and C−D do not vary even when the reproducing head H is shifted radially, disabling precise positioning of the reproducing head H.

In order to obtain a high S/N ratio, many magnetic recorders are provided with two magnetic heads, one high output MR (MagnetoResistive) head for reproducing and one ID (InDuctive) head for recording. Further, the width of the reproducing head is usually designed to be narrower than that of the recording head. So, the erase bands 4 derived by a wide recording head gives comparatively large effect for a narrow reproducing head, easily resulting in appearances of the indifferent zones.

That is a problem.

SUMMARY OF THE INVENTION

Therefore, a primary object of the present invention is to provide a high density magnetic recorder wherein a high precision positioning can be realized, preventing the problem of the indifferent zones because of the erase bands in the burst pattern.

In order to achieve the object, in a high density magnetic recorder of the invention having means for positioning a reproducing head making use of a burst pattern including a recorded area consisting of two recorded bands recorded in adjacent two of burst tracks of a magnetic disk and erased bands derived on outer border lines of the adjacent two of burst tracks, width of a reproducing head is designed not to be narrower than width of a pitch of the burst tracks added with width of the erased band and not to be wider than two times said width of a pitch of the burst tracks reduced of said width of the erased band.

Therefore, there appears no indifferent zone where signal intensity obtained by the reproducing head from the burst pattern does not vary when radial position of the reproducing head is changed, in the invention, enabling a precise positioning of the reproducing head.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts, and:

DETAILED DESCRIPTION OF THE PREFERRED EMBODIMENTS

Now, embodiments of the present invention will be described in connection with the drawings.

Figure 1:
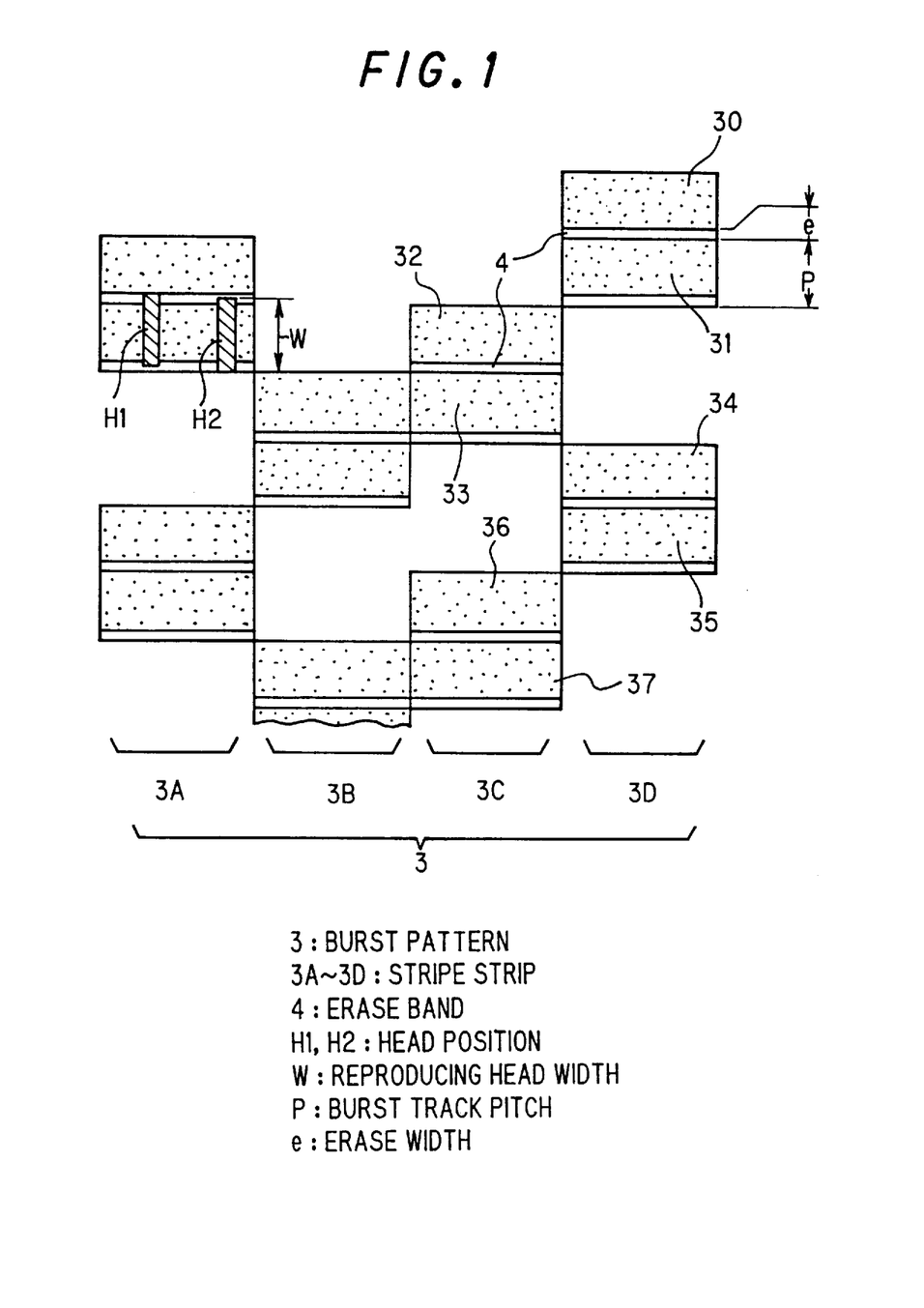
FIG. 1 illustrates a burst pattern 3 and positions H1 and H2 of a reproducing head having a narrow width W.

A minimum condition of width W of a reproducing head H is considered first, where both of the signal intensity differences A–B and C–D do not vary despite a change of the radial position of the reproducing head H, in connection with example of the burst pattern 3 illustrated in FIG. 4B, of which a magnified pattern is illustrated in FIG. 1.

In case when the width W of the reproducing head H, of which examples of positions H1 and H2 are illustrated in FIG. 1, is not wider than P+e, that is, width of a recorded band in a burst track and two erase bands 4 on its two border lines, the signal intensity A at the stripe strip 3A remains the same even if radial position of the reproducing head H is changed from the position H1, where upper end of the reproducing head H aligned with lower edge of recorded band of upper burst track, to the position H2, where lower end of the reproducing head H is aligned with the upper edge of the recorded band of lower burst track (of the adjacent stripe strip 3B). In the case, the signal intensity B at the stripe strip 3B also remains the same, zero, as there is no recorded band to be detected by the reproducing head H. Therefore, it can be said that the signal intensity difference A–B does not vary even when radial position of the reproducing head H is changed from the position H1 to the position H2 when W<P+e.

In the same way, the signal intensity C at the stripe strip 3C does not vary and the signal intensity D at the stripe strip 3D remains zero, too, even if the radial position of the reproducing head H varies from the position H1 to the position H2, when W<P+e.

Thus, an indifferent zone from the position H1 and the position H2 appears when W<P+e.

Therefore, a following condition (1) is introduced, from above consideration, for eliminating the appearance of the indifferent zone.

$$P+e \leq W \tag{1}$$

Figure 2:
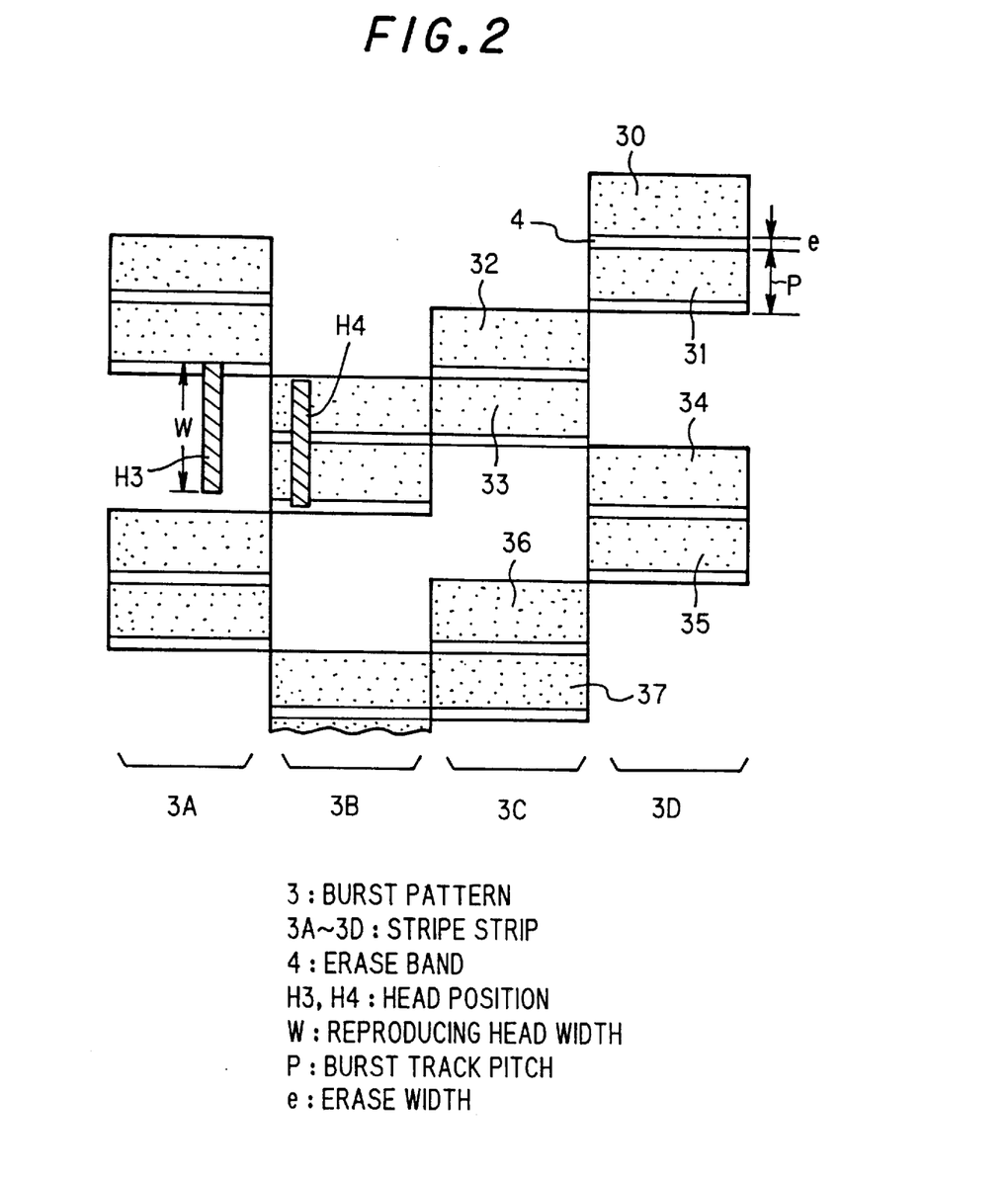
FIG. 2 illustrates a burst pattern 3 and positions H3 and H4 of a reproducing head having a wide width W.

Next, a maximum condition of the width W of the reproducing head H will be considered referring to FIG. 2. In FIG. 2, there are illustrated examples of a position H3, where upper end of the reproducing head H aligned with lower edge of recorded band of a burst track in the stripe strip 3A, and another position H4, where the upper end of the reproducing head H aligned with upper edge of recorded band of the adjacent lower burst track in the stripe strip 3B.

In case when the reproducing head width W is represented by 2P–e<W<2P, both the signal intensities A at the stripe strip 3A and B at the stripe strip 3B do not vary even if the reproducing head H is changed between the position H3 and the position H4, and the signal intensity difference A–B remains the same, and it is the same also as for the signal intensity difference C–D. So, an indifferent zone from the position H3 to the position H4 appears also on condition when 2P–e<W<2P.

From above consideration, following condition (2) is also required for eliminating appearance of the indifferent zone.

$$W \leq 2P-e \tag{2}$$

Here, it is noted that the driving pitch of the servo mechanism, that is, the width P of a burst track pitch should be wider than the erase width e, since, if it is not, there is no recorded band to be left.

From these considerations, width W of a reproducing head H of the present invention is designed for satisfying following condition (3) introduced from the above conditions (1) and (2).

$$P+e \leq W \leq 2P-e \tag{3}$$

Therefore, a high precision positioning call be realized in the high density magnetic recorder of the invention, wherein prevented the problem of indifferent zone where both of the signal intensity differences A–B and C–D remain at the same value at the same time.

In the following paragraphs, some experimental results are described.

Figure 3:
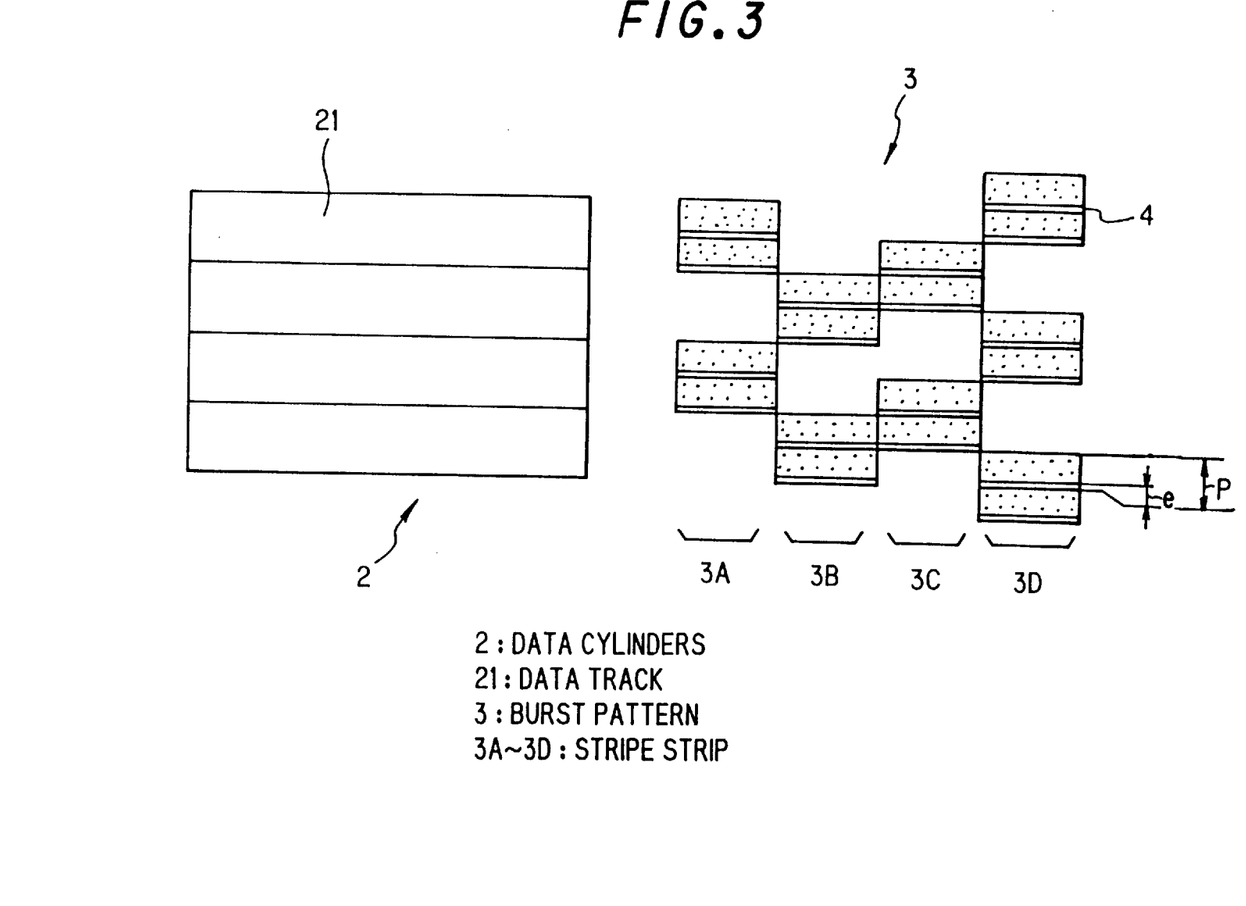
FIG. 3 illustrates data cylinders 2 composed of a plurality of data tracks 21 and a burst pattern 3 recorded therein.

FIG. 3 illustrates data cylinders 2 composed of a plurality of data tracks 21 and a burst pattern 3 recorded therein. The data cylinders 2 are situated at 21 mm from a center of a magnetic disk applied for the experiment having a glass substrate coated with Cr (Chrome) thin film of 100 nm thick, on which a CoCrPt recording layer of 30 nm thick having coercivity of 2100 Oe is formed. The burst pattern 3 is recorded on the data cylinders 2 rotating with an angle speed of 7200 rpm with a signal of 60 mA (peak-to-peak) of a frequency of 6.67 MHz.

As for the recording head, two kinds of ID heads are used for recording the burst pattern 3. The first ID head with a magnetic gap length of 0.03 μm is provided with a pole of FeTaN having a pole width of 3.5 μm, and upper and lower pole thicknesses of both 3.0 μm, while the second ID head with the same magnetic gap length of 0.03 μm is provided with a pole of NiFe with upper pole width of 3.8 μm, lower pole width of 5.0 μm and upper and lower pole thickness of 4.0 μm.

In the burst pattern 3 recorded by the first ID head, there are derived erase bands of 0.2 μm width, while those of 0.4 μm are derived by the second ID head.

Here, in recording the burst pattern 3, whole recording surface of the magnetic disk is first erased with a erasing current of 30 mA (0 to peak) and then recording bands are recorded in the first burst track 30, which are followed by recording bands in the second burst track 31 after shifting the recording head by 2.1 μm for the outer radial direction. In the same way, recording bands in the third and the fourth burst tracks 32 and 33 follow. By repeating these processes, the recording bands are recorded in the burst tracks more than 33 onto the outer edge of the magnetic disk, composing the four stripe strips 3A to 3D wherein recording areas of 4.2

μm width each consisting of two recording bands and two erase bands, of 0.2 or 0.4 μm width according to kind of the recording head, are ranged in turn with blanking areas having the same width.

The burst pattern 3 composed of the four stripe strips 3A to 3D, thus recorded on the magnetic disk, is read by two kinds of MR reproducing heads each having 2.3 μm width or 2.8 μm width, respectively. The output signal intensity of the MR reproducing head from the burst pattern 3 is controlled to have a certain amplitude making use of an AGC (Automatic Gain Control) pattern recorded on another part of the data section of the magnetic disk 1, and demodulated into the signal intensity differences A–B and C–D by way of an area detector module ML4533 of the Micro Linea Corporation, in the experiment.

Figure 5:
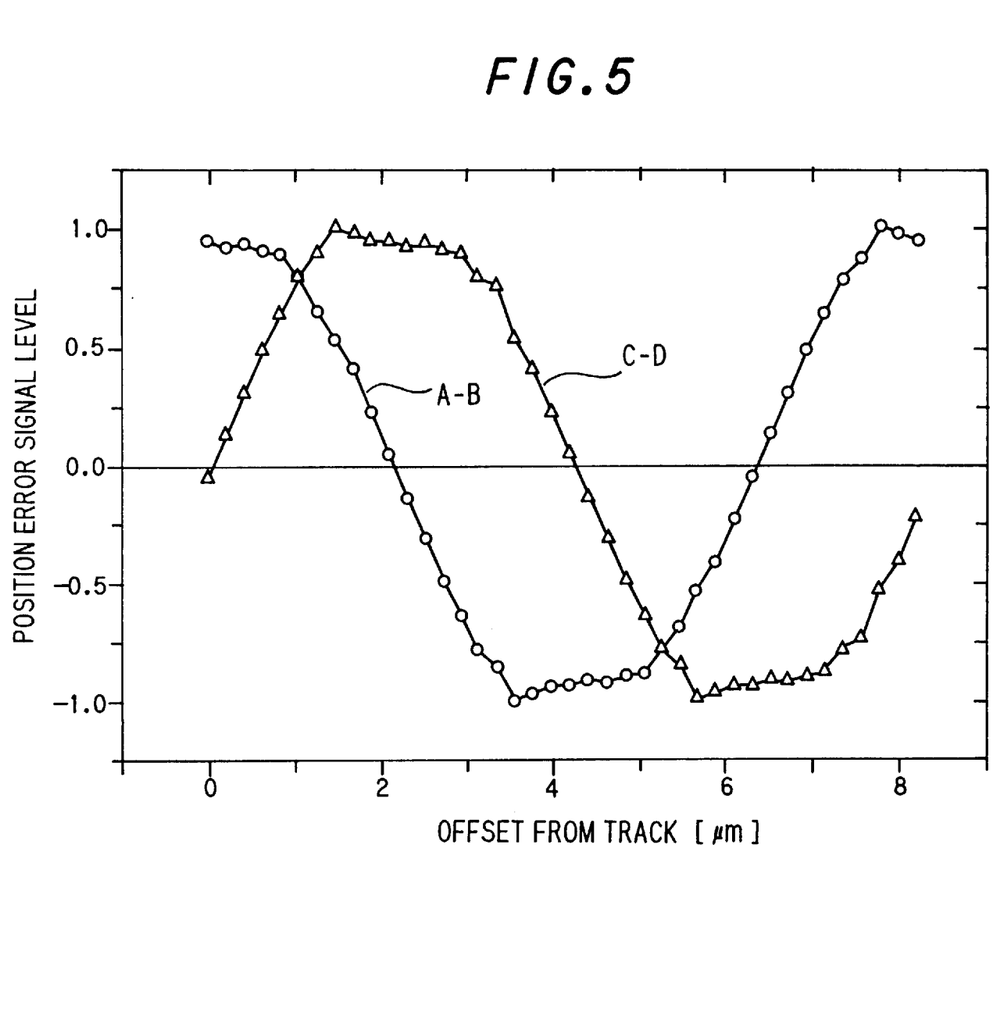
FIG. 5 is a waveform charts illustrating two signal intensity differences A−B and C−D obtained from a burst pattern 3 including erase bands of 0.2 μm, recorded by a first ID head with a driving pitch P of 2.1 μm, reproduced by a MR head having 2.3 μm width.
Figure 6:
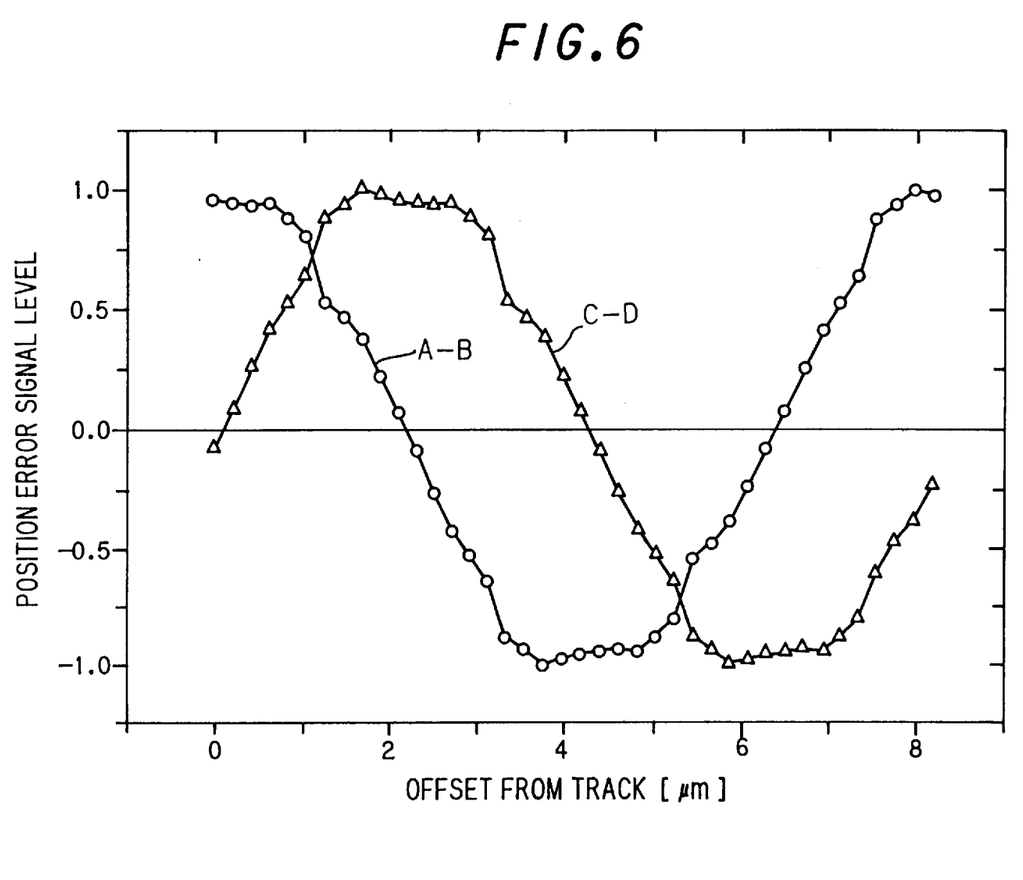
FIG. 6 is a waveform charts illustrating the two signal intensity differences A−B and C−D obtained from the burst pattern 3, reproduced by another MR head having 2.8 μm width.

FIG. 5 and FIG. 6 are waveform charts illustrating the two signal intensity differences A–B and C–D obtained from a burst pattern 3 recorded by the first ID head, reproduced by the two MR heads having 2.3 μm width (FIG. 5) and 2.8 μm width (FIG. 6), respectively, measured by shifting them step by step of 0.2 μm.

Burst track pitch P of the burst pattern 3 recorded by the first ID head being 2.1 μm and erase width e thereof being 0.2 μm as beforehand described, P+e=2.3 μm and 2P−e=4 μm. So, the condition (3) is satisfied both with the two MR heads having widths of 2.3 μm and 2.8 μm. Therefore, no indifferent zone, where both of the two signal intensity differences A–B and C–D don't vary, is detected in the waveform charts of FIGS. 5 and 6.

Figure 7:
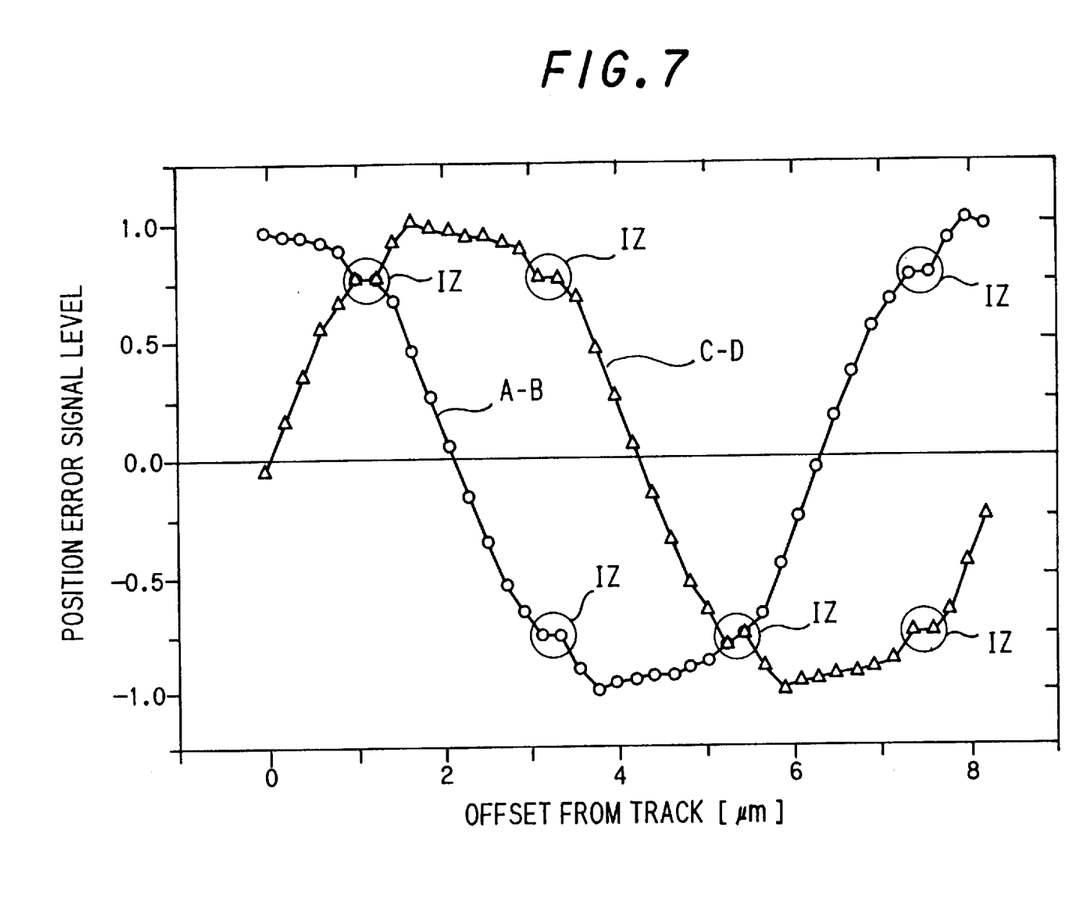
FIG. 7 is a waveform chart illustrating the two signal intensity differences A–B and C–D obtained by the same MR head of FIG. 5, from another burst pattern 3 including erase bands of 0.4 μm, recorded by a second ID head with the same driving pitch P of 2.1 μm.
Figure 8:
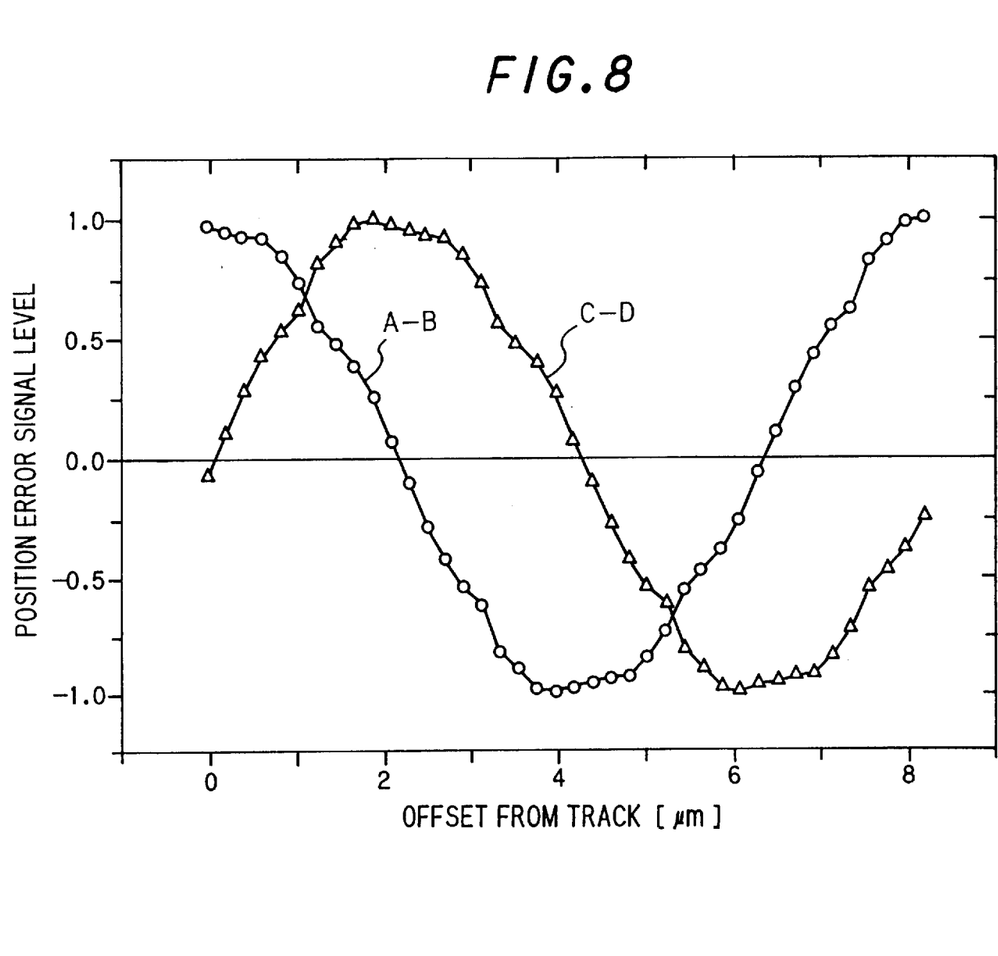
FIG. 8 is a waveform chart illustrating the two signal intensity differences A–B and C–D obtained by the same MR head of FIG. 6, from the same burst pattern 3 of FIG. 7.

FIG. 7 and FIG. 8 are waveform charts illustrating the signal intensity differences A–B and C–D obtained by the same two MR heads in the same way with FIGS. 5 and 6 by shifting them in the radial direction step by step of 0.2 μm, from another burst pattern 3 recorded in the same way with the second ID head, wherein the burst track pitch P is 2.1 μm but the erasing width e is 0.4 μm as beforehand described. In the examples here, P+e=2.5 μm and 2P−e=3.8 μm. So, the MR head having width of 2.3 μm does not satisfy the condition (3), while the other MR head of 2.8 μm width satisfies it.

Figure 9:
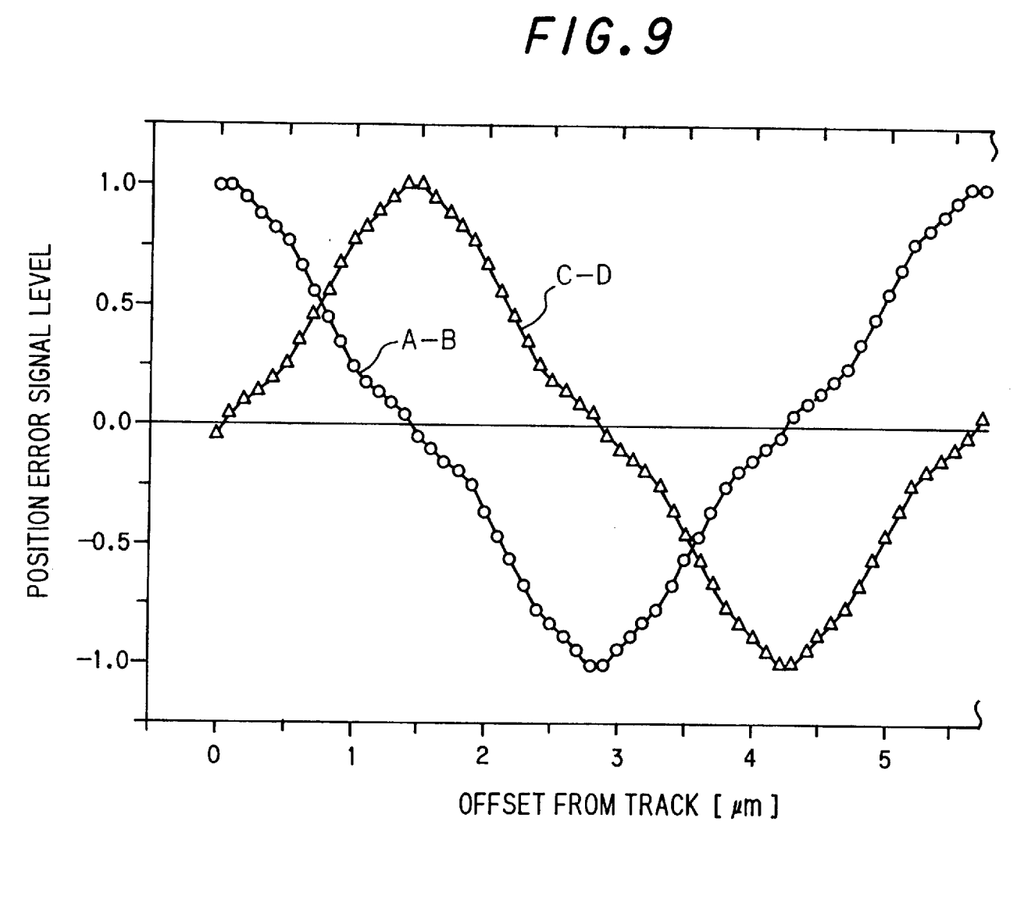
FIG. 9 is a waveform chart illustrating the two signal intensity differences A–B and C–D obtained by the same MR head of FIG. 7, from still another burst pattern 3, which is drawn in a similar way with the burst patterns applied for FIGS. 5 to 8, but using the second ID head controlled with a little shorter servo driving pitch P of 1.4 μm.
Figure 10:
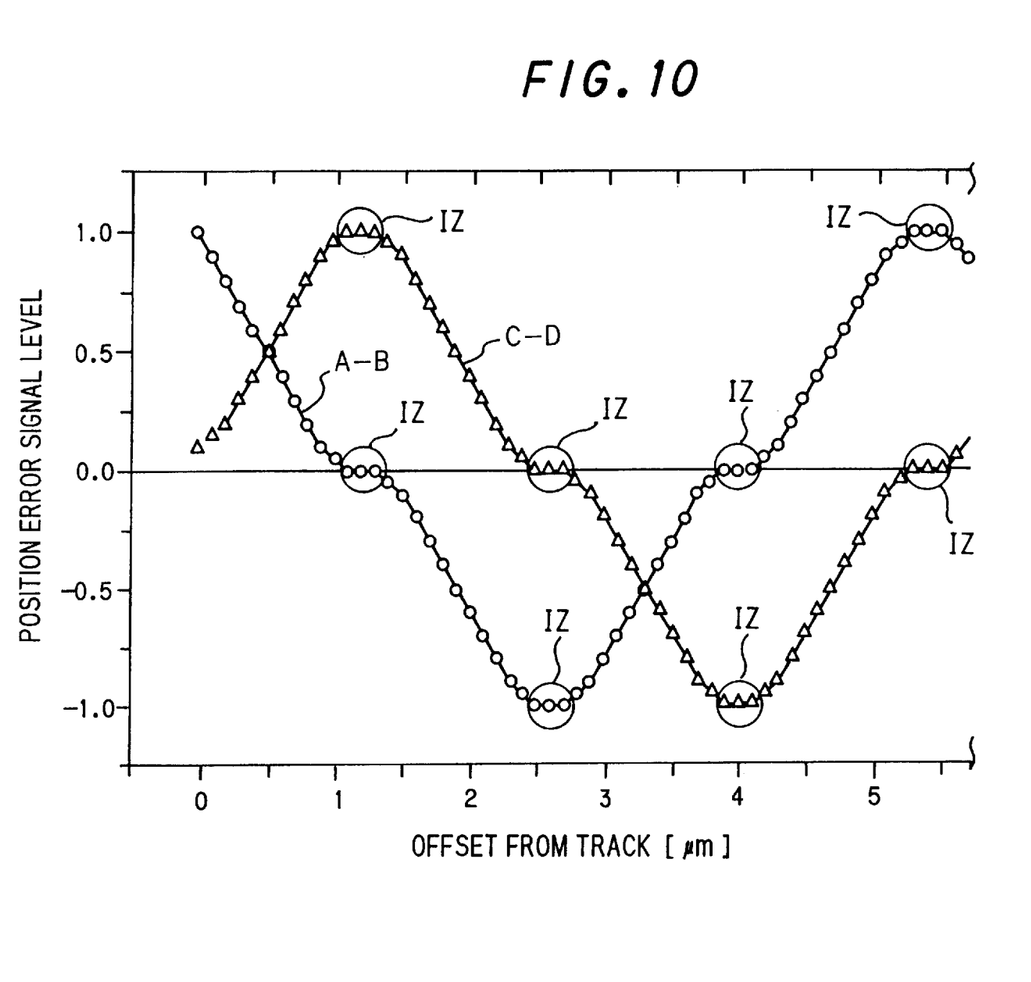
FIG. 10 is a waveform chart illustrating the two signal intensity differences A–B and C–D obtained by the same MR head of FIG. 8, from the same burst pattern 3 of FIG. 9.

Therefore, the indifferent zones IZ, where both of the two signal intensity differences A–B and C–D don't vary, are found in FIG. 7 illustrating waveforms obtained by the MR head of width of 2.3 μm, and none of them is found in FIG. 8 obtained by the MR head having width of 2.8 μm, FIG. 9 and FIG. 10 are also waveform charts illustrating the signal intensity differences A–B and C–D obtained by the same two MR heads in the same way with FIGS. 5 to 8 by shifting them in the radial direction step by step of 0.1 μm, from still another burst pattern 3, which is drawn in a similar way with the burst patterns applied for FIGS. 5 to 8, but using the second ID head controlled with a little shorter servo driving pitch P of 1.4 μm. Therefore, each of the stripe strips 3A to 3D is composed of a sequence of a blank area of 2.8 μm and a recorded area of the same width including two erase bands 4 each having 0.4 μm width. So, P+e=1.8 μm and 2P−e=2.4 μm, here for experimental measurements of FIGS. 9 and 10.

Thus, there is found no indifferent zone IZ in the waveform chart of FIG. 9 which is obtained by the MR head having 2.3 μm width satisfying the condition (3), and they are found in the waveform chart of FIG. 10 obtained by the MR head having 2.8 μm width not satisfying the condition (3).

Heretofore, there are described some experimental results wherein MR heads are applied for the reproducing head, for example. However, it can be easily understood that the same results will be obtained with a reproducing head of other types such as a spin bubble head, a GMR (Gigant MagnetoResistive) head or an ID head, or with a recording head of other materials than NiFe and FeTaN.

What is claimed is:

1. A high density magnetic recorder having means for positioning a reproducing head which use a burst pattern including a recorded area of two recorded bands recorded in two adjacent burst tracks of a magnetic disk and erase bands derived on outer border lines of the two adjacent burst tracks; the high density magnetic recorder comprising:

a reproducing head having a width not narrower than a width of a pitch of the burst tracks combined with a width of the erase band, and not wider than two times the width of the pitch of the burst tracks reduced by the width of the erase band.

2. A high density magnetic recorder as recited in claim 1, wherein the width of the erase band is narrower than the width of a pitch of burst tracks.

3. A high density magnetic recorder which positions a reproducing head by use of a burst pattern including a recorded area of two recorded bands recorded in two adjacent burst tracks of a magnetic disk and erase bands derived on outer border lines of the two adjacent burst tracks, the high density magnetic recorder comprising:

a reproducing head having a width not narrower than a width of a pitch of the burst tracks combined with a width of the erase band, and not wider than two times the width of the pitch of the burst tracks reduced by the width of the erase band.

4. A high density magnetic recorder as recited in claim 3, wherein the width of the erase band is narrower than the width of a pitch of burst tracks.

* * * * *